US012710947B2

(12) United States Patent
Chen et al.

(10) Patent No.: US 12,710,947 B2
(45) Date of Patent: Aug. 18, 2026

(54) COMPUTER SYSTEM, CONTAINER MANAGEMENT METHOD, AND APPARATUS

(71) Applicant: Huawei Cloud Computing Technologies Co., Ltd., Guizhou (CN)

(72) Inventors: Xian Chen, Gui'an (CN); Shaobao Feng, Hangzhou (CN); Yongming Zhang, Beijing (CN)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 96 days.

(21) Appl. No.: 18/179,644

(22) Filed: Mar. 7, 2023

(65) Prior Publication Data

US 2023/0205505 A1 Jun. 29, 2023

Related U.S. Application Data

(63) Continuation of application No. PCT/CN2021/116842, filed on Sep. 7, 2021.

(30) Foreign Application Priority Data

Sep. 8, 2020 (CN) ......................... 202010932403.5
Dec. 31, 2020 (CN) ......................... 202011618590.6

(51) Int. Cl.
*G06F 9/455* (2018.01)
*G06F 8/61* (2018.01)
(Continued)

(52) U.S. Cl.
CPC ............ *G06F 8/63* (2013.01); *G06F 9/45533* (2013.01); *G06F 9/5055* (2013.01)

(58) Field of Classification Search
CPC ....... G06F 8/63; G06F 9/45533; G06F 9/5055
See application file for complete search history.

(56) References Cited

U.S. PATENT DOCUMENTS 9,176,752 B1 11/2015 Marr et al.
11,245,640 B1 * 2/2022 Maurya ................. G06F 18/217
(Continued)

FOREIGN PATENT DOCUMENTS

CN 107844539 A * 3/2018 ............ G06F 16/22
WO 2007002710 A1 1/2007

OTHER PUBLICATIONS

PDF Engilish version of Yang et al. (CN 107844539 A), Isolation Data Management Method, Device, System, Computing Device, and Storage Medium (Year: 2018).*
(Continued)

*Primary Examiner* — S. Sough
*Assistant Examiner* — Mohammad H Kabir
(74) *Attorney, Agent, or Firm* — Fish & Richardson P.C.

(57) ABSTRACT

Computer systems, container management methods, and apparatuses are provided. In an implementation, a method comprises receiving a container creation request sent by a container cluster management node, wherein the container cluster management node is connected to the offloading card inserted in and communicably coupled to a computing node, obtaining a container image based on the container creation request, and indicating, through a communication channel established between the offloading card and the computing node, the computing node to create a container on the computing node based on the container image.

18 Claims, 7 Drawing Sheets

(51) Int. Cl.
*G06F 9/50* (2006.01)
*H04L 41/5054* (2022.01)

(56) References Cited

U.S. PATENT DOCUMENTS 11,470,144 B1 * 10/2022 Maurya .................. H04L 67/10
11,573,814 B1 * 2/2023 Aithal .................. G06F 16/188
11,573,816 B1 * 2/2023 Featonby ................ H04L 67/10
2009/0300301 A1 12/2009 Vaghani
2012/0250686 A1 * 10/2012 Vincent ............... H04L 12/4633
370/392
2014/0314091 A1 10/2014 Vincent et al.
2015/0227325 A1 8/2015 Rupanagunta et al.
2017/0052808 A1 2/2017 Liguori et al.
2017/0090971 A1 3/2017 Liguori et al.
2019/0107965 A1 4/2019 Deval et al.
2019/0392150 A1 * 12/2019 Shevade ............. H04L 61/2517
2020/0186600 A1 6/2020 Dawani et al.

OTHER PUBLICATIONS

Extended European Search Report in European Appln No. 21865952.2, dated Jan. 5, 2024, 11 pages.
Qingdao Yinggu Education Technology co. Ltd., "Cloud Computing and Virtualization Technology," Xidian University Press, Dec. 31, 2018, 9 pages (with English translation).

* cited by examiner

COMPUTER SYSTEM, CONTAINER MANAGEMENT METHOD, AND APPARATUS

CROSS-REFERENCE TO RELATED APPLICATIONS

This application is a continuation of International Application No. PCT/CN2021/116842, filed on Sep. 7, 2021, which claims priority to Chinese Patent Application No. 202010932403.5, filed on Sep. 8, 2020, and Chinese Patent Application No. 202011618590.6, filed on Dec. 31, 2020. All of the aforementioned patent applications are hereby incorporated by reference in their entireties.

TECHNICAL FIELD

This application relates to the field of cloud computing, and in particular, to a virtual machine management method and apparatus based on a server cabinet.

BACKGROUND

With continuous development of cloud technologies, instances deployed in data centers gradually evolve from virtual machines to containers due to advantages of containers such as lightness and high speed. Currently, most container management architectures are constructed based on an existing infrastructure as a service (IAAS) layer. In addition to containers, IAAS layer-related service proxy function and container management components need to be deployed on computing nodes, to manage the containers on the computing nodes.

The container management components deployed on the computing nodes occupy resources on the computing nodes, causing resource consumption of the computing nodes.

SUMMARY

This application provides a computer system, a container management method, and an apparatus, to reduce resource consumption on a computing node for implementing container management.

According to a first aspect, an embodiment of this application provides a container management method. The method is applied to an offloading card, and may be performed by the offloading card. The offloading card is inserted into a computing node. A communication channel is established between the offloading card and the computing node, and the offloading card is connected to a container cluster management node (which may also be referred to as a management node for short) through a network. In the method, the management node may send a container creation request to the offloading card. After receiving the container creation request sent by the management node, the offloading card may obtain a container image based on the container creation request. For example, the offloading card may obtain the container image from a container image repository, and store the container image on a storage resource that can be accessed by the offloading card. The storage resource may be a local memory of the offloading card, or may be a memory connected to the offloading card. Then, the offloading card may indicate, using the communication channel, the computing node to create a container on the computing node based on the container image.

According to the foregoing method, the computing node does not need to directly interact with the management node. To be specific, the computing node does not need to manage the container, and the container is created and managed by the offloading card inserted into the computing node. The computing node no longer needs to consume a resource to support a container management function, improving resource utilization of the computing node.

In a possible implementation, when indicating the computing node to create the container on the computing node based on the container image, the offloading card may create a virtual function device. For differentiation, the virtual function device herein is referred to as a first virtual function device. After creating the first virtual function device, the offloading card may associate the container image with the first virtual function device, and indicate, through the communication channel, the computing node to create a container runtime environment for the container and mount the first virtual function device under a root directory of the container.

According to the foregoing method, the offloading card provides the container image to the computing node in a form of a virtual function device, to ensure that the computing node can create the container based on the container image. A container creation manner is simple and convenient.

In a possible implementation, the offloading card may be further connected, through the network, to a storage service node on which a storage service is deployed, and the offloading card may provide a storage resource for the container on the computing node. The offloading card first applies to the storage service node for the storage resource, and then sets a virtual function device based on the storage resource. For ease of differentiation, the virtual function device herein is referred to as a second virtual function device. After the second virtual function device is set, the offloading card may mount the second virtual function device under a directory of the container through the communication channel.

According to the foregoing method, the storage resource of the container is provided for the computing node in a form of the second virtual function device, such that the container on the computing node can access the storage resource using the second virtual function device, and store data on the storage resource. This allows the offloading card to provide the storage resource for the container on the computing node, further reducing resource consumption on the computing node.

In a possible implementation, when setting the second virtual function device based on the storage resource, the offloading card may first create the second virtual function device, and then associate the storage resource with the second virtual function device.

According to the foregoing method, the offloading card can locally create the virtual function device, and provide the virtual function device for the container on the computing node, such that the container on the computing node obtains the storage resource.

In a possible implementation, the storage resource may be an object storage resource, or may be a block storage resource. When the storage resource is a file storage resource, the offloading card may directly provide the file storage resource for the computing node in a form of a network file system, and indicate the computing node to mount the network file system under the directory of the container. In other words, the file storage resource may not be associated with the second virtual function device.

According to the foregoing method, the offloading card can provide different types of storage resources for the container on the computing node, applicable to object storage, file storage, and block storage scenarios. This effectively extends an application scope.

In a possible implementation, when mounting the second virtual function device under the directory of the container through the communication channel, the offloading card may use different mounting manners for different types of containers. If the container is a common container, the offloading card may directly mount the second virtual function device under the directory (for example, a storage directory) of the container through the communication channel. If the container is a secure container, the offloading card directly connects, through the communication channel, the second virtual function device to the secure container virtual machine that is used to deploy the container, and the secure container virtual machine mounts the second virtual function device under the directory of the container.

According to the foregoing method, different mounting manners are used for different types of containers, to ensure that the container can obtain the storage resource. In this way, the container can subsequently store data on a corresponding storage resource.

In a possible implementation, the offloading card may be connected to a network service node through the network. In addition to providing the storage resource to the container on the computing node, the offloading card may further provide a network resource for the container on the computing node. The offloading card may first apply to the network service node for the network resource. After obtaining the network resource, the offloading card may set a virtual function device based on the network resource. For ease of differentiation, the virtual function device herein is referred to as a third virtual function device. After the third virtual function device is set, the offloading card may set the third virtual function device in the container through the communication channel.

According to the foregoing method, the network resource of the container is provided for the computing node in a form of the third virtual function device, such that the container on the computing node can obtain the network resource using the third virtual function device, and the container has a network capability. This allows the offloading card to provide the network resource for the container on the computing node, ensures that the offloading card can implement a container management function, and further reduces resource consumption on the computing node.

In a possible implementation, when setting the third virtual function device based on the network resource, the offloading card may first create the third virtual function device, and then associate the network resource with the third virtual function device.

According to the foregoing method, the offloading card can locally create the virtual function device, and provide the virtual function device for the container on the computing node, such that the container on the computing node obtains the network resource, and the container has a network capability.

In a possible implementation, the offloading card sets a network processing rule for the third virtual function device. The network processing rule includes some or all of the following: a load balancing policy, a security group policy, quality of service, a routing rule (routing), and an address mapping rule. The security group policy may include an access control list (ACL). The address mapping rule includes address translation (network address translation, NAT) and full address translation (FULL NAT). The NAT includes but is not limited to destination address translation (DNAT), source address translation (source network address translation, SNAT), and port translation (PNAT).

According to the foregoing method, the network processing rule is set for the virtual function device, such that the container can have a service discovery capability, a network policy capability, and the like, and a strong network capability.

In a possible implementation, when setting the third virtual function device in the container through the communication channel, the offloading card may use different setting manners for different types of containers. If the container is a common container, the offloading card may add the third virtual function device to a namespace of the container through the communication channel. If the container is a secure container, the offloading card may directly connect, through the communication channel, the third virtual function device to a secure container virtual machine that is used to deploy the container.

According to the foregoing method, different setting manners are used for different types of containers, to ensure that the container can obtain the network resource, and subsequently, the container can have a network capability.

In a possible implementation, there are many types of communication channels. A type of the communication channel is not limited in this embodiment of this application. For example, the communication channel may be a PCIe channel.

Using the foregoing method, the offloading card may efficiently exchange information with the computing node through the PCIe channel. This further ensures that the offloading card can manage the container on the computing node.

According to a second aspect, an embodiment of this application further provides a container management apparatus. The container management apparatus is located in an offloading card, and has a function of the offloading card in the method embodiment in the first aspect. For beneficial effects, refer to the descriptions of the first aspect. Details are not described herein again. The function may be implemented by hardware, or may be implemented by hardware executing corresponding software. The hardware or the software includes one or more units corresponding to the foregoing function. In a possible design, a structure of the apparatus includes a transmission unit, an obtaining unit, and a notification unit, and optionally further includes a first setting unit and a second setting unit. These units may perform corresponding functions in the method example in the first aspect. For details, refer to detailed descriptions in the method example. Details are not described herein again.

According to a third aspect, an embodiment of this application further provides an apparatus. The apparatus may be an offloading card, and has a function of the offloading card in the method embodiment in the first aspect. For beneficial effects, refer to the descriptions of the first aspect. Details are not described herein again. A structure of the apparatus includes a processor and a memory. The processor is configured to support the offloading card to perform a corresponding function in the method in the first aspect. The memory is coupled to the processor, and stores program instructions and data that may be necessary for the communication apparatus. The structure of the communication apparatus further includes a communication interface configured to communicate with another device.

According to a fourth aspect, an embodiment of this application further provides a computer system. For beneficial effects, refer to the related descriptions of the first aspect. Details are not described herein again. The computing system includes an offloading card and a computing node. The offloading card is inserted into the computing node. A communication channel is established between the offloading card and the computing node. The offloading card is further connected to a container cluster management node through a network.

The offloading card is configured to receive a container creation request sent by the container cluster management node, and obtain a container image based on the container creation request.

The computing node is configured to obtain the container image through the communication channel, and create a container based on the container image.

In a possible implementation, after obtaining the container image, the offloading card may create a first virtual function device, and associate the container image with the first virtual function device. Alternatively, the offloading card may further provide the first virtual function device for the computing node through the communication channel. When obtaining the container image, the computing node may obtain the first virtual function device through the communication channel. After obtaining the first virtual function device, the computing node may create a container runtime environment for the container, and mount the first virtual function device under a root directory of the container.

In a possible implementation, the offloading card may be further connected to a storage service node through the network, and the offloading card may cooperate with the computing node to configure a storage resource for the container on the computing node. The offloading card may first apply to the storage service node for the storage resource. After obtaining the storage resource, the offloading card may set a second virtual function device based on the storage resource, and provide the second virtual function device for the computing node through the communication channel. After obtaining the second virtual function device through the communication channel, the computing node may mount the second virtual function device under a directory of the container.

In a possible implementation, when setting the second virtual function device based on the storage resource, the offloading card may create the second virtual function device, and then associate the storage resource with the second virtual function device.

In a possible implementation, the storage resource may be an object storage resource, or may be a block storage resource. When the storage resource is a file storage resource, the offloading card may directly provide the file storage resource for the computing node in a form of a network file system, and indicate the computing node to mount the network file system under the directory of the container. In other words, the file storage resource may not be associated with the second virtual function device. The offloading card may indicate the computing node to mount the network file system under the directory of the container.

In a possible implementation, when mounting the second virtual function device under a directory of the container, the computing node may use different mounting methods for different types of containers. For a common container that is different from a secure container, the computing node may directly mount the second virtual function device under the directory of the container. For a secure container, the computing node may directly connect the second virtual function device to a secure container virtual machine that is used to deploy the container, and the secure container virtual machine mounts the second virtual function device under the directory of the container.

In a possible implementation, the offloading card is further connected to a network service node through the network, and the offloading card may cooperate with the computing node to configure a network resource for the container on the computing node. The offloading card may first apply to the network service node for the network resource. After obtaining the network resource, the offloading card may set a third virtual function device based on the network resource, and provide the third virtual function device for the computing node through the communication channel. The computing node may obtain the third virtual function device through the communication channel, and set the third virtual function device in the container.

In a possible implementation, when setting the third virtual function device based on the network resource, the offloading card may create the third virtual function device, and associate the network resource with the third virtual function device.

In a possible implementation, when setting the third virtual function device based on the network resource, the offloading card may set a network processing rule for the third virtual function device. The network processing rule includes some or all of the following: a load balancing policy, a security group policy, a routing rule (routing), an address mapping rule, and quality of service QoS.

In a possible implementation, when setting the third virtual function device in the container, the computing node may use different mounting methods for different types of containers. For a common container, the computing node may add the third virtual function device to a namespace of the container. For a secure container, the computing node directly connects the third virtual function device to a secure container virtual machine that is used to deploy the container.

In a possible implementation, the communication channel is a peripheral component interconnect express PCIe channel.

According to a fifth aspect, an embodiment of this application further provides a container management method. The method is jointly performed by an offloading card and a computing node. For beneficial effects, refer to the related descriptions of the first aspect. Details are not described herein again. The offloading card is inserted into the computing node. A communication channel is established between the offloading card and the computing node. The offloading card is further connected to a container cluster management node through a network.

The offloading card is configured to receive a container creation request sent by the container cluster management node, and obtain a container image based on the container creation request.

The computing node obtains the container image through the communication channel, and creates a container based on the container image.

In a possible implementation, after obtaining the container image, the offloading card may create a first virtual function device. Alternatively, the offloading card may associate the container image with a first virtual function device, and provide the first virtual function device for the computing node through the communication channel. When obtaining the container image, the computing node may obtain the first virtual function device through the communication channel, create a container runtime environment for the container, and mount the first virtual function device under a root directory of the container.

In a possible implementation, the offloading card is further connected to a storage service node through the network, and the offloading card may cooperate with the computing node to configure a storage resource for the container. The offloading card may first apply to the storage service node for the storage resource, and then set a second virtual function device based on the storage resource. After setting the second virtual function device, the offloading card may provide the second virtual function device for the computing node through the communication channel. After obtaining the second virtual function device through the communication channel, the computing node may mount the second virtual function device under a directory of the container.

In a possible implementation, when setting the second virtual function device based on the storage resource, the offloading card may create the second virtual function device, and then associate the storage resource with the second virtual function device.

In a possible implementation, the storage resource may be an object storage resource, or may be a block storage resource. When the storage resource is a file storage resource, the offloading card may directly provide the file storage resource for the computing node in a form of a network file system, and indicate the computing node to mount the network file system under a directory of the container. The offloading card may indicate the computing node to mount the network file system under the directory of the container. In this case, the file storage resource may not be associated with the second virtual function device.

In a possible implementation, when the computing node mounts the second virtual function device under a directory of the container, for a common container that is different from a secure container, the computing node may directly mount the second virtual function device under the directory of the container. For a secure container, the computing node may directly connect the second virtual function device to a secure container virtual machine that is used to deploy the container, and the secure container virtual machine mounts the second virtual function device under the directory of the container.

In a possible implementation, the offloading card is further connected to a network service node through the network. The offloading card may further cooperate with the computing node to configure a network resource for the container, such that the container has a network capability. The offloading card may first apply to the network service node for the network resource, set a third virtual function device based on the network resource, and provide the third virtual function device for the computing node through the communication channel. The computing node may obtain the third virtual function device through the communication channel, and set the third virtual function device in the container.

In a possible implementation, when setting the third virtual function device based on the network resource, the offloading card may first create the third virtual function device, and then associate the network resource with the third virtual function device.

In a possible implementation, when setting the third virtual function device based on the network resource, the offloading card may further set a network processing rule for the third virtual function device. The network processing rule includes some or all of the following: a load balancing policy, a security group policy, a routing rule, an address mapping rule, and quality of service.

In a possible implementation, when the computing node sets the third virtual function device in the container, for a common container, the computing node may add the third virtual function device to a namespace of the container. For a secure container, the computing node directly connects the third virtual function device to a secure container virtual machine that is used to deploy the container.

In a possible implementation, the communication channel is a peripheral component interconnect express PCIe channel.

According to a sixth aspect, this application further provides a computer-readable storage medium. The computer-readable storage medium stores instructions. When the instructions are run on a computer, the computer is enabled to perform the method according to the first aspect and the possible implementations of the first aspect or perform the method according to the fifth aspect and the possible implementations of the fifth aspect.

According to a seventh aspect, this application further provides a computer program product including instructions. When the computer program product runs on a computer, the computer is enabled to perform the method according to the first aspect and the possible implementations of the first aspect or perform the method according to the fifth aspect and the possible implementations of the fifth aspect.

According to an eighth aspect, this application further provides a computer chip. The chip is connected to a memory. The chip is configured to read and execute a software program stored in the memory, to perform the method according to the first aspect and the possible implementations of the first aspect or perform the method according to the fifth aspect and the possible implementations of the fifth aspect.

DESCRIPTION OF EMBODIMENTS

Figure 1:
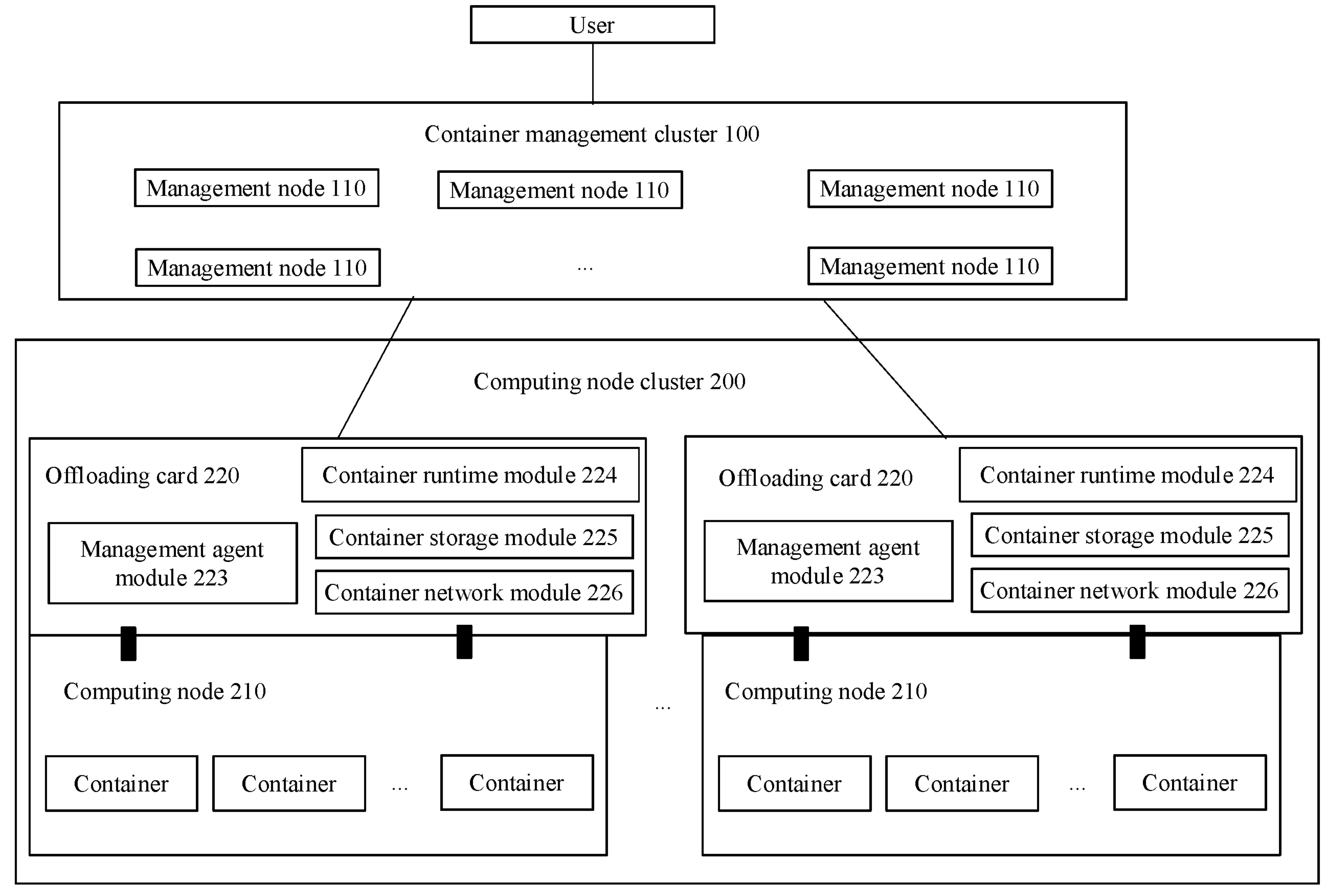
FIG. 1 is a schematic diagram of an architecture of a system according to this application.

FIG. 1 is a schematic diagram of an architecture of a system according to an embodiment of this application. The system includes a container management cluster 100 and a computing node cluster 200.

The container management cluster 100 is located between a user and the computing node cluster 200, and can interact with the user and the computing node cluster 200. The user interacts with the container management cluster 100, to manage a container on a computing node 210 leased by the user or all computing nodes 210. The management herein includes but is not limited to: creating a container, deleting a container, and inquiring a container.

The container management cluster 100 may include one or more management nodes 110. Each management node 110 can manage a container on one or more computing nodes 210 in the computing node cluster.

A deployment location and a form of the management node 110 are not limited in this embodiment of this application. For example, the management node 110 may be a computing node 210 deployed in a cloud computing device system or an edge computing device system, or may be a terminal computing device close to the user side. Different management nodes 110 may be deployed in a same system, or may be deployed in different systems. For example, the management nodes 110 may be deployed in a cloud computing device system or an edge computing system, or may be distributedly deployed in a cloud computing device system, an edge computing system, and a terminal computing device.

The computing node cluster 200 includes one or more computing nodes 210, and an offloading card 220 may be further inserted into each computing node 210. An architecture type of the computing node 210 is not limited in this embodiment of this application. The computing node 210 may be a computing node 210 in an X86 architecture, or may be a computing node 210 in an ARM architecture.

The offloading card 220 inserted into the computing node 210 is a hardware apparatus having a data processing capability. The offloading card 220 may include components such as a processor, a memory, a hardware acceleration apparatus, and a network adapter. Alternatively, the offloading card 220 may be connected to a network adapter. In this embodiment of this application, the offloading card 220 may interact with the management node 110, and indicate, according to an instruction delivered by the management node 110, a computing node 210 on which the offloading card 220 is located to create a container. Alternatively, the offloading card 220 may manage, according to an instruction delivered by the management node 110, a container on a computing node 210 on which the offloading card 220 is located. The management herein includes but is not limited to: creating a container, deleting a container, and inquiring a container.

The following uses creating a container as an example to describe an interaction process between the user, the container management cluster 100, and the computing node cluster 200.

The user may send a container creation request to the management node 110 in the container management cluster 100 through a client. The container creation request may carry resource configuration information of the container. The resource configuration information of the container may indicate a resource to be occupied by the container. After receiving the container creation request, the management node 110 may locally record resource configuration information of the container, select a target computing node for the container based on a resource status of the one or more managed computing nodes 210, and schedule the container to the target computing node. An offloading card 220 inserted into the target computing node monitors a scheduling operation of the management node 110. When detecting that the management node 110 schedules the container to the target computing node, the offloading card 220 prepares a corresponding resource for the container, and indicates the computing node 210 on which the offloading card 220 is located to create the container using the resource.

The target computing node creates the container based on the indication of the offloading card 220. After detecting that the container is created, the offloading card 220 may report status information of the container (the status information includes but is not limited to a running status of the container, a running status of a service on the container, a resource usage of the container, and the like) to the management node 110. The management node 110 may present the status information of the container to the user through the client. The user can also inquire the status information of the container through the client.

Processes of deleting and inquiring a container are similar to the foregoing process. A difference lies in that information exchanged between the user, the container management cluster 100, and the computing node cluster 200 is different. For details, refer to the foregoing description. Details are not described herein again.

It can be learned from the foregoing description that a container management function is offloaded to the offloading card 220, and the offloading card 220 manages the container on the computing node 210. The computing node 210 only needs to run the container, and the computing node 210 does not have the container management function. This can reduce a resource for implementing the container management function on the computing node 210, such that a resource on the computing node 210 is effectively used.

Figure 2:
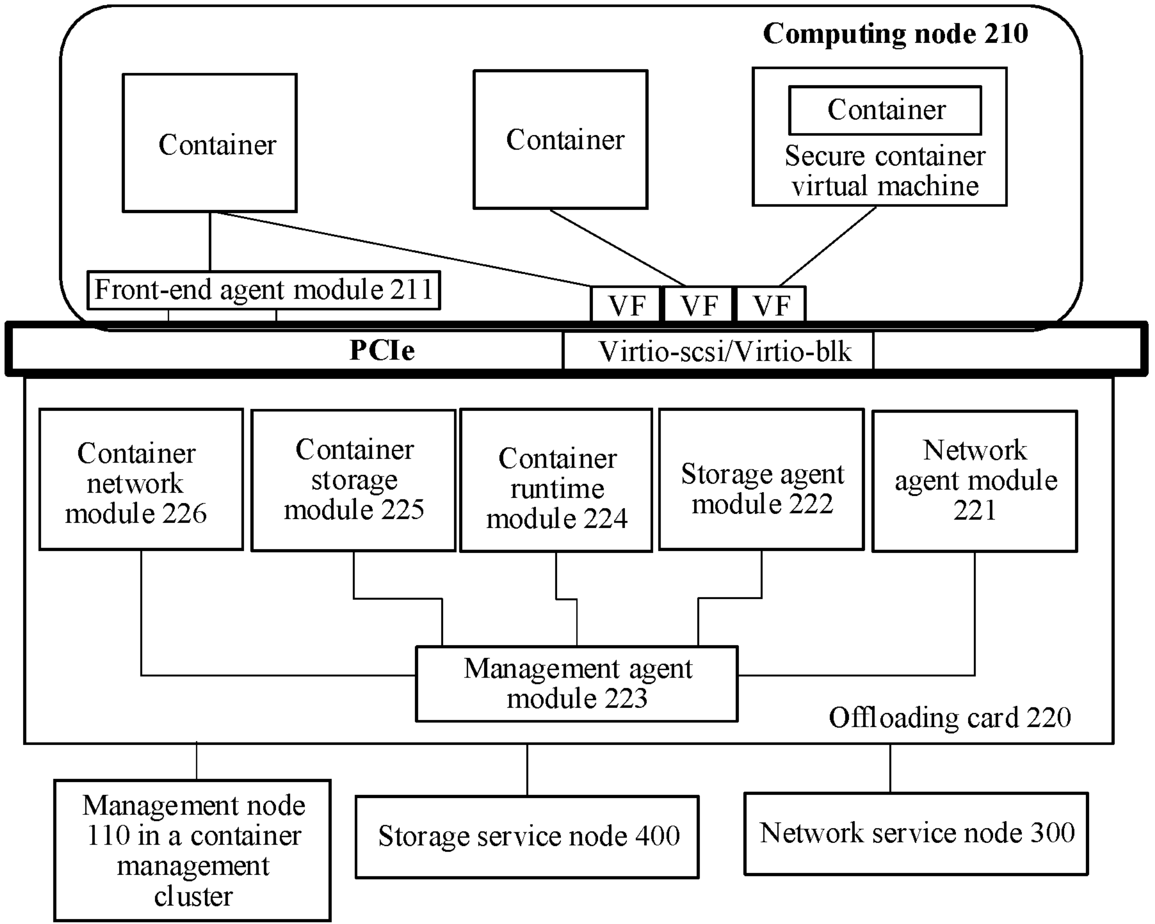
FIG. 2 is a schematic diagram of an architecture of another system according to this application.

The following describes a structure of one computing node 210 and an offloading card 220 inserted into the computing node 210. Refer to FIG. 2. The offloading card 220 can interact with one or more management nodes 110 in a container management cluster 100. The offloading card 220 can further interact with a computing node 210 on which the offloading card 220 is located.

In addition, to configure or update a network resource for a container on the computing node 210, the offloading card 220 may further interact with a virtual network service node 300 (which may also be referred to as a network service node for short), and is connected to the virtual network service node 300 through a network. A virtual network service is deployed on the virtual network service node 300. The virtual network service node 300 can provide the virtual network service for the computing node 210 and the container on the computing node 210. The virtual network service is an external service needed by the container, and can provide the network resource for the container. In this way, containers on different computing nodes 210 can implement network interworking, and the container has a network capability.

To configure or update a storage resource for the container on the computing node 210, the offloading card 220 can further interact with a storage service node 400, and is connected to the storage service node 400 through the network. The storage service node 400 may be deployed with a storage service such as a block storage service, a file storage service, or an object storage service. The block storage service, the file storage service, and the object storage service all belong to a distributed storage service. The distributed storage service means that storage resources can be distributedly deployed on different storage nodes. The storage service node 400 can provide storage resources for the computing node 210 and the container on the computing node 210, such that data on the computing node 210 or the container on the computing node can be stored on the storage node.

A network agent module 221 and a storage agent module 222 may be deployed in the offloading card 220. The network agent module 221 is configured to interact with the virtual network service node 300, and apply to the virtual network service node 300 for the network resource for the container on the computing node 210. The storage agent module 222 is configured to interact with the storage service node 400, and apply to the storage service node 400 for the storage resource for the container on the computing node 210.

The offloading card 220 can manage the container on the computing node 210 based on an indication of the management node 110. The offloading card 220 includes a management agent module 223, a container runtime module 224, a container storage module 225, and a container network module 226.

The management agent module 223 is a general command for implementing container management on the offloading card 220. The management agent module 223 can trigger the container runtime module 224 to prepare a container image and establish a runtime environment for the container, and can trigger the container storage module 225 to prepare the storage resource for the container, and trigger the container network module 226 to prepare the network resource for the container. The management agent module 223 may further interact with the management node 110, and report status information of the container on the computing node 210 and a resource status on the computing node 210 to the management node 110. After the offloading card 220 is started, the management agent module 223 can communicate with the computing node 210 (for example, a front-end agent module 211 on the computing node 210), obtain the resource status on the computing node 210 using the front-end agent module 211, and then report the resource status on the computing node 210 to the management node 110. When the management node 110 is to schedule the container, the resource status on the computing node 210 may be used as a reference, to determine a target computing node to which the container is to be scheduled.

The container runtime module 224 can create the container image and establish the runtime environment for the container. A representation form of the container image is not limited in this embodiment of this application. For example, the container runtime module 224 obtains the container image from a container image repository, and loads the container image to a storage resource that can be accessed by the offloading card 220 (the container runtime module 224). For example, the storage resource is a local storage resource of the offloading card 220, or may be a storage resource connected to the offloading card 220, for example, a memory such as a magnetic disk. Then, the container runtime module 224 presents the container image to the computing node 210 in a form of a virtual function (VF) device (for example, a first VF device in this embodiment of this application). The virtual function device may be presented to the computing node 210 in a form of a single-root input/output virtualization (SRIOV) device. A protocol supported by the SRIOV device is not limited herein. The protocol may be virtio-blk, virtio-scsi, virtio-fs, virtio-9p, or the like.

The container in this embodiment of this application may be a common container, to be specific, the container does not need to be highly secure, and does not need to be isolated from another container. The container runtime module 224 may establish, for the container, a lightweight isolation environment for running the container. A namespace (namespace), a control group (control group, cgroup), and the like need to be configured for establishing the lightweight isolation environment.

The namespace may used to isolate a resource required by the container, such as inter-process communication (IPC), a network resource, and a file system. The resource required by the container can be isolated from a resource required by another container through the namespace, such that the resource is exclusive. The cgroup is used to restrict the resource isolated by the namespace. For example, a weight (representing a priority) and a resource usage may be configured for the resource.

The container may also be a secure container. Compared with a common container, the secure container has a higher security requirement, and needs to be isolated from another container. The container runtime module 224 may first establish, for the secure container using the front-end agent module 211, a secure container virtual machine exclusively occupied by the secure container, and then indicate the front-end agent module 211 to create the container in the secure container virtual machine, to obtain the container with higher security isolation, namely, the secure container. The secure container virtual machine is a virtual machine particularly used to deploy the secure container.

The container network module 226 is configured to prepare the network resource for the container on the computing node 210, such that the container on the computing node 210 can implement network interworking with another container using the network resource. In this way, the container has a network capability. The network capability of the container may include a network interworking capability between containers, a service discovery capability, and a network policy control capability.

When creating the container, the container network module 226 applies to the virtual network service node 300 for a network resource using the network agent module 221. The network resource may include a network port resource, and may further include another network resource. Then, an association relationship is established between the applied network resource and a virtual function device (for example, a fourth VF device in this embodiment of this application). The network resource is presented to the computing node 210 in a form of the virtual function device, such that the container uses the network resource. The container on the computing node 210 can interact with another container using the virtual function device.

The container storage module 225 may prepare the storage resource for the container on the computing node 210, for example, a block storage resource, a file storage resource, and an object storage resource. The container storage module 225 may interact with the storage service node 400 using the storage agent module 222 in the offloading card 220, to apply for the storage resource, such as a block storage resource or an object storage resource. The container storage module 225 mounts the storage resource to the offloading card 220. Then, the container storage module 225 presents the storage resource to the container on the computing node 210 using a virtual function device (for example, a second VF device and a third VF device in this embodiment of this application). For descriptions of the virtual function device, refer to the foregoing descriptions, and details are not described herein again.

In this embodiment of this application, the offloading card 220 may communicate with the computing node 210 using an internet protocol. The internet protocol may be a peripheral component interconnect express (PCIe) protocol. In other words, a communication channel between the offloading card 220 and the computing node 210 is a PCIe channel.

This embodiment of this application does not limit a form in which the offloading card 220 communicates with the computing node 210 through the PCIe channel. For example, the offloading card 220 may be connected to the computing node 210 in a form of a PCIe protocol-based network adapter that supports a network protocol stack, and communicate with the computing node 210. Alternatively, the offloading card 220 may be connected to the computing node 210 in a form of a PCIe protocol-based virtio-vsock device with a virtio architecture, and communicate with the computing node 210. This embodiment of this application only uses an example in which the communication channel between the offloading card 220 and the computing node 210 is the PCIe channel. A type of the communication channel between the offloading card 220 and the computing node 210 is not limited in this embodiment of this application. Any communication channel that allows communication between the offloading card 220 and the computing node 210 is applicable to this embodiment of this application.

With reference to the accompanying drawings, the following separately describes container management, storage resource configuration, and a network resource configuration manner.

(1) Container Management

Container management includes creating a container, deleting a container, and the like, covering an entire lifecycle of the container. The following describes processes of creating and deleting a container.

1. Create a Container

Figure 3:
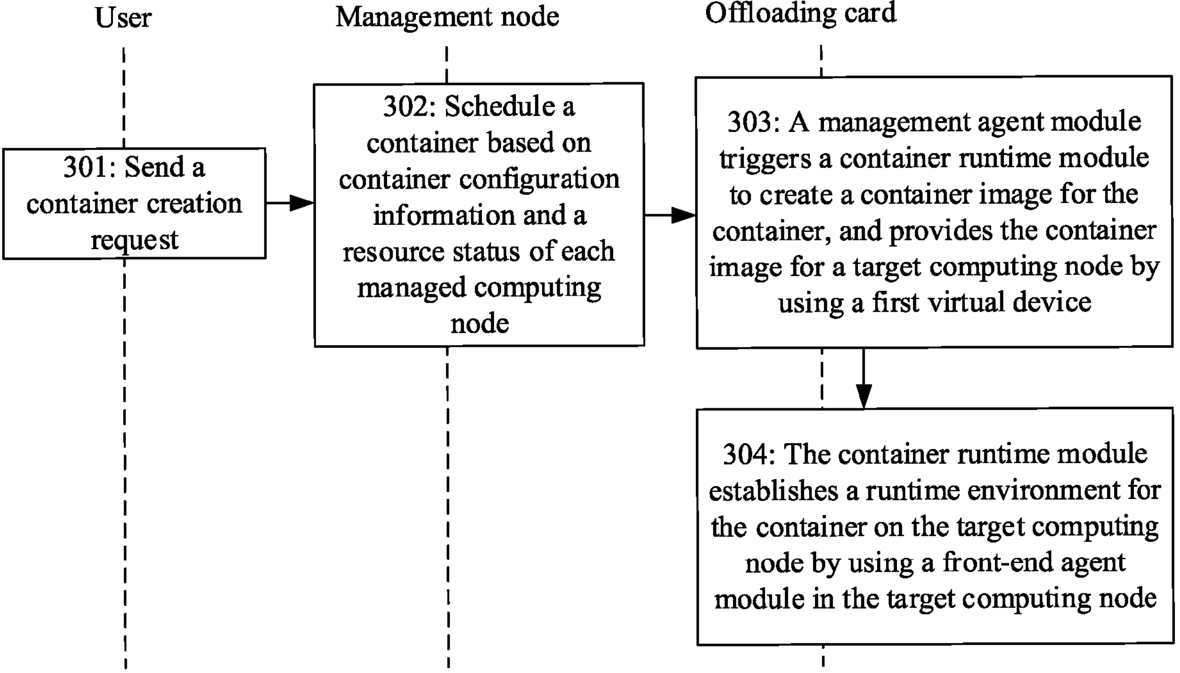
FIG. 3 is a schematic diagram of a container creation method according to this application.

FIG. 3 is a schematic diagram of a container creation method according to an embodiment of this application. The method includes the following steps.

Step 301: A user sends a container creation request to a management node 110 in a container management cluster 100. The container creation request carries resource configuration information of the container. The resource configuration information of the container may indicate a resource to be occupied by the container. The resource includes but is not limited to a processor, a memory space, a storage resource, and a network resource (for example, the network resource may be a host machine network, or an independent network).

The resource configuration information of the container can describe information such as a type and a size of the resource to be occupied by the container. For example, the container resource configuration information may indicate a quantity of processors and a size of memory space. Alternatively, the container resource configuration information may indicate that a type of the storage resource is a block storage resource, a file storage resource, or an object storage resource, and a size of the storage resource. The container resource configuration information may further indicate that the network resource is a host machine network (namely, a network that needs to reuse a computing node 210) or an independent network (namely, a network that is separately configured for the container and that is independent of the computing node 210). Alternatively, the container resource configuration information may indicate a service discovery capability (service) and a network control policy (network policy) capability to be supported by the network resource, and a quantity of network ports.

This embodiment of this application does not limit a manner of interaction between the user and the management node 110. For example, the user may select or enter, through a client deployed on the user side, resource configuration information of the container to be created. After detecting the resource configuration information of the container that is selected or entered by the user, the client sends the container creation request to the management node 110 under triggering of the user (for example, the user clicks a "create" option on an interface provided by the client).

For another example, the user may directly interact with the management node 110, and the management node 110 may provide a container creation interface for the user. On the interface, the user may select or enter the configuration information of the container to be created, and the user triggers (for example, the user clicks a "create" option on an interface provided by the management node 110) the container creation request.

Step 302: After receiving the container creation request, the management node 110 schedules the container based on the container configuration information and a resource status of each managed computing node 210, and sends a container creation request to a target computing node.

The resource status of each managed computing node 210 may be collected by the management node 110 in advance. For any computing node 210 managed by the management node 110, the management node 110 may obtain a resource status of the computing node 210 using a management agent module 223 on an offloading card 220 inserted into the computing node 210. The resource status on the computing node 210 may indicate an idle resource of the computing node 210. The resource herein includes but is not limited to a memory space, a processor, a storage resource, and the like.

The management node 110 may actively send a resource status obtaining request to the management agent module 223 on the offloading card 220, to request the management agent module 223 to report the resource status of the computing node 210. Further, the management node 110 obtains the resource status on the computing node 210 from the management agent module 223.

The management agent module 223 on the offloading card 220 may also actively report the resource status of the computing node 210 to the management node 110. For example, after the offloading card 220 is started, the management agent module 223 periodically reports the resource status of the computing node 210 to the management node 110.

The scheduling the container by the management node 110 means determining a target computing node to be deployed in the container, and sending the container creation request to the target computing node. The management node 110 sends the container creation request in many manners, and two manners are shown below.

In a first manner, the management node 110 schedules the container using a container resource database. The container resource database is a database jointly maintained by all management nodes 110 in the container management cluster 100. The container resource database records related information (such as the resource configuration information, container identifier information, and container status information) of containers on all computing nodes 210 in the computing node cluster 200 and a computing node 210 on which a container is located. In other words, the container resource database includes a correspondence between the container and the computing node 210.

The management node 110 may select, from the computing nodes 210, a computing node 210 whose idle resource can support the container as the target computing node. After determining the target computing node, the management node 110 updates a scheduling result to the container resource database. The scheduling result indicates the target computing node to be deployed in the container.

When a new container is to be created, after determining the target computing node, the management node 110 may update the correspondence between the container and the target computing node to the container resource database.

It should be noted that, the container resource database recording the container and the computing node 210 means recording the resource configuration information of the container, the container identifier information, and identifier information of the computing node 210. A type of the container identifier information is not limited herein. For example, the container identifier information may be an identifier configured for the container when the container is created, or may be a container name. Any manner in which the container can be uniquely identified is applicable to this embodiment of this application. A specific type of the identifier information of the computing node 210 is not limited herein. For example, the identifier information of the computing node 210 may be an identifier of the computing node 210 in the computing node cluster 200, or may be a name of the computing node 210. Any manner that can uniquely identify the computing node 210 is applicable to this embodiment of this application.

In a second manner, after selecting, from the computing nodes 210, the target computing node on which the container can be deployed, the management node 110 may directly send the container creation request to the target computing node (for example, a container management module in the target computing node).

Optionally, the management node 110 may further store a scheduling result in a container resource database.

After detecting that the management node 110 schedules the container to the target computing node, the management agent module 223 may start to create the container. The creating the container mainly includes two operations: configuring a container image (referring to step 303), and configuring a runtime environment for the container (referring to step 304).

Step 303: The management agent module 223 in the offloading card 220 triggers a container runtime module 224 to create the container image for the container, and provides the container image for the target computing node using a first virtual function device. The container image is a set of a configuration file and a tool library required for running the container, for example, a required library file, a required system configuration file, and a required system tool.

For the two manners in which the management node 110 schedules the container to the target computing node in step 302, the management agent module 223 may detect a scheduling operation of the management node 110 in the following two manners.

In a first manner, the management agent module 223 may monitor the container resource database in real time, to determine the container to be deployed on the target computing node. When detecting that the container resource database is updated, determine, based on information added in the container resource database, whether there is a new container to be deployed on the target computing node.

In a second manner, when receiving the container creation request, the management agent module 223 determines that the management node 110 schedules the container to the target computing node.

When configuring the container image for the container, the container runtime module 224 may obtain the container image from a container image repository deployed at a remote end, and load the container image to a storage resource that can be accessed by the offloading card 220. Then, the first VF device is created, and the container image is bound (which may also be referred to as associated) to the first VF device. The container runtime module 224 provides the container image for the target computing node using the first VF device. The first VF device may be an SRIOV device.

It should be noted that, when obtaining the container image from the container image repository, the container runtime module 224 may further obtain the container image as required. In other words, only some data of the container image is obtained, and the some data is associated with the first VF device, and is provided for the target computing node. In a subsequent container startup or running process, the container runtime module 224 obtains other data required by the container image from the container image repository, and provides the other data for the target computing node using the first VF device.

Step 304: The container runtime module 224 in the offloading card 220 establishes the runtime environment for the container on the target computing node using a front-end agent module 211 in the target computing node.

The runtime environment varies with a container type.

If the container is a common container, the container runtime module 224 creates a common container runtime environment for the container on the target computing node using the front-end agent module 211. The common container runtime environment includes a namespace and a cgroup.

If the container is a secure container, the container runtime module 224 creates a secure container virtual machine for the container on the target computing node using the front-end agent module 211. After the secure container virtual machine is started, the container runtime module 224 creates a corresponding runtime environment for the container inside the secure container virtual machine.

Step 305: The front-end agent module 211 mounts, based on an indication of the management agent module 223, the first VF device under a root directory (a rootfs) of the container.

When the first VF device is an SRIOV device, the front-end agent module 211 may access the first VF device based on a protocol such as virtio-scsi and virtio-blk. For a common container, after detecting the first VF device, the front-end agent module 211 may directly mount the first VF device under the root directory of the container. For a secure container, the front-end agent module 211 may directly connect the first VF device to the secure container virtual machine, and the secure container virtual machine mounts the first virtual machine device under the root directory of the container.

Step 306: After the container is successfully created, the management agent module 223 synchronizes container status information to a container cluster resource database.

Figure 4:
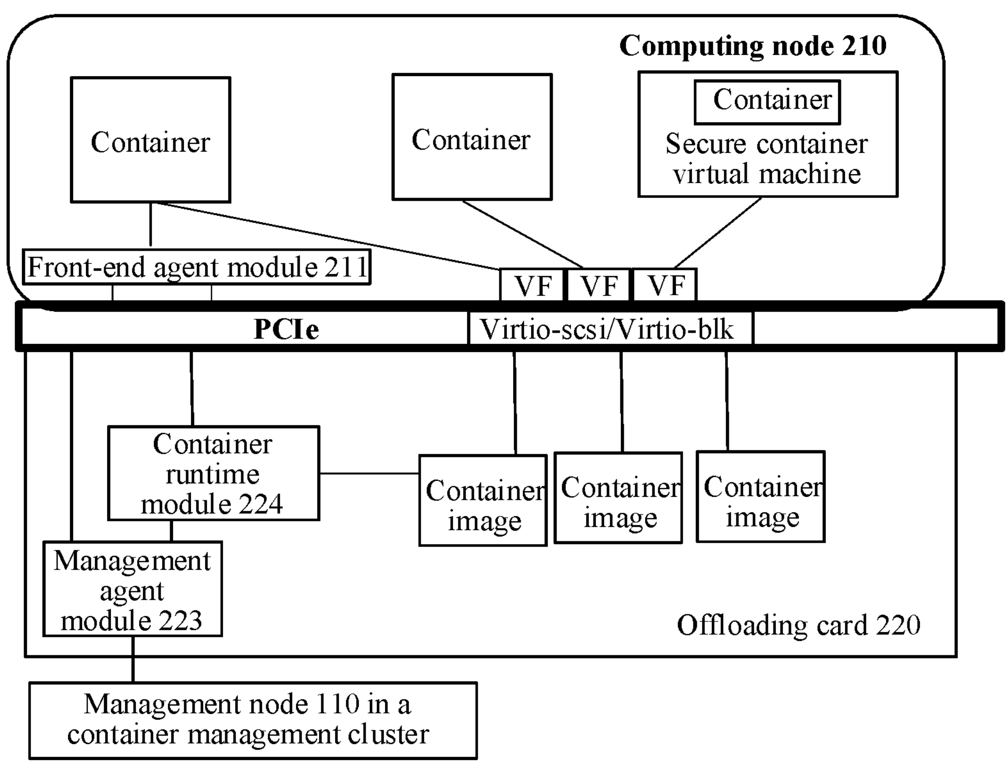
FIG. 4 is a flowchart of container creation according to this application.

FIG. 4 is a schematic flowchart of container creation. In FIG. 4, a management node 110 may schedule a container to a computing node 210. When an offloading card 220 detects that a container is scheduled to the computing node 210, a management agent module 223 may trigger a container runtime module 224 to prepare a container image for the container, and provide the container image for a target computing node using a first VF device. The management agent module 223 in the target computing node may invoke the container runtime module 224 to create a runtime environment for the container.

2. Delete a Container

Figure 5:
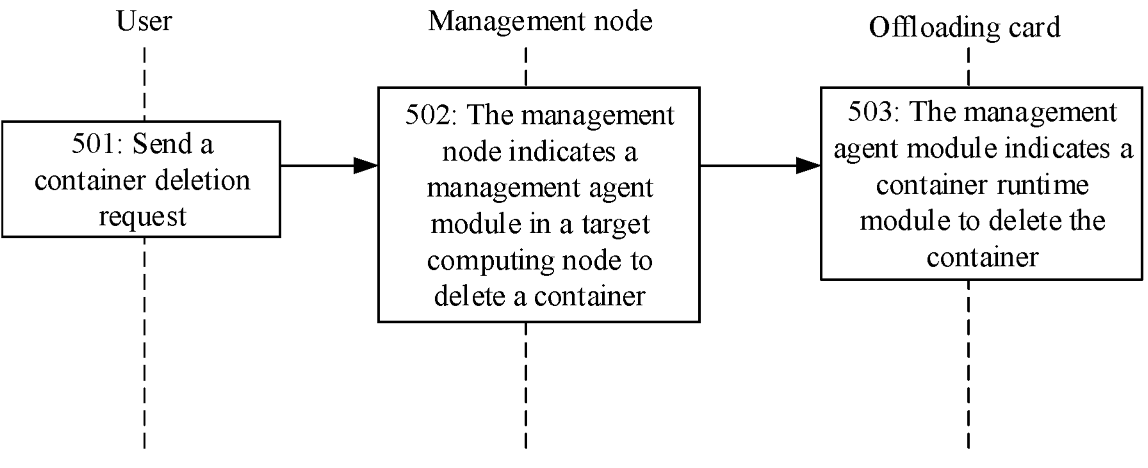
FIG. 5 is a schematic diagram of a container deletion method according to this application.

FIG. 5 is a schematic diagram of a container deletion method according to an embodiment of this application. The method includes the following steps.

Step 501: A user sends a container deletion request to a management node 110 in a container management cluster 100. The container deletion request includes container identifier information.

The user sends the container deletion request to the management node 110 in the container management cluster 100 in a similar manner in which the user sends a container creation instruction to the management node 110 in the container management cluster 100. For details, refer to the foregoing description. Details are not described herein again.

Step 502: After receiving a container creation request, the management node 110 indicates a management agent module 223 in a target computing node to delete a container.

The management node 110 indicates the management agent module 223 in the target computing node to delete the container in two manners.

In a first manner, the management node 110 marks a container status in a resource database as deleted. The management agent module 223 in the target computing node determines, by monitoring the resource database, the container to be deleted.

In a second manner, the management node 110 sends a container deletion instruction to the management agent module 223 in the target computing node, to indicate the management agent module 223 to delete the container.

Step 503: The management agent module 223 indicates a container runtime module 224 to delete the container.

The container runtime module 224 may release a runtime environment of the container by invoking a front-end agent module 211 in the target computing node. For different types of containers, manners of releasing the runtime environments of the containers are different.

If the container is a common container, the front-end agent module 211 may deliver an end signal to a container process. After the container process ends, the front-end agent module 211 releases a namespace and a cgroup that are occupied by the container. The front-end agent module 211 may further offload a first VF device bound to a container image.

If the container is a secure container, the front-end agent module 211 may first deliver an end signal to a container process using a secure container virtual machine. After the container process ends, the front-end agent module 211 clears a resource occupied by the container in the secure container virtual machine, and offloads a first VF device bound to a container image. After the resource occupied by the container in the virtual machine is cleared, a secure container virtual machine process may be ended.

(2) Storage Resource Configuration

Figure 6:
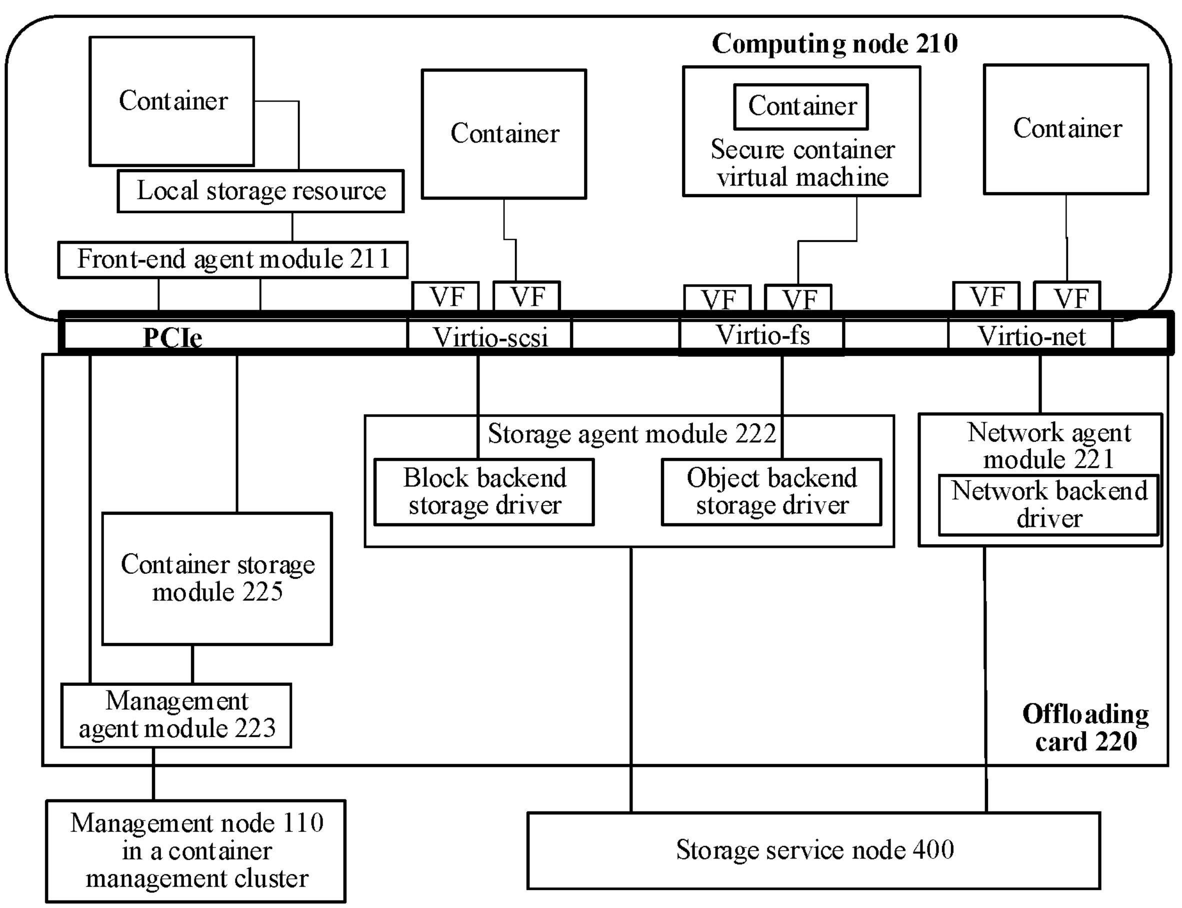
FIG. 6 is a schematic diagram of a method for configuring a storage resource for a container according to this application.

After a container is created, a storage resource can be configured for the container. FIG. 6 is a schematic flowchart of configuring a storage resource for a container. When a management agent module 223 detects that a management node 110 schedules a container to a target computing node, if detecting a resource database update or receiving a container creation request, the management agent module 223 may determine, based on the updated resource database or the container creation request, a storage resource to be configured for the container. The management agent module 223 triggers a container storage module 225 to configure the storage resource for the container. The container storage module 225 may apply to different types of storage service nodes 400 (for example, a block storage service node, an object storage service node, and a file storage service node) for the storage resource using a storage agent module 222. Then, the container storage module 225 establishes an association relationship between a virtual function device and the storage resource using the storage service agent module, and provides the virtual function device for a computing node 210. A front-end agent module 211 on the computing node 210 may mount the virtual function device under a storage directory of the container.

The storage resource includes but is not limited to a block storage resource, an object storage resource, a file storage resource, a local storage resource, or the like.

The following describes a manner of configuring different types of storage resources for the container.

1) Block storage resource: The block storage resource may be presented in a form of a block device.

The block storage resource may be applied for by the storage agent module 222 in an offloading card 220 in advance. Alternatively, when determining that the container is scheduled to the target computing node, the management agent module 223 may trigger the storage agent module 222 to apply to a storage service node 400 for the block storage resource. In other words, regardless of whether the block storage resource is applied for in advance or in real time, the block storage resource is applied for by the storage agent module 222. After the block storage resource is applied for, the storage agent module 222 may mount the block storage resource to the offloading card 220, in other words, present the block storage resource to the offloading card 220 for use in a form of a device.

The container storage module 225 may create a second VF device, and associate the block storage resource with the second VF device, in other words, establish an association relationship between the block storage resource and the second VF device. In a process in which the management agent module 223 triggers a container runtime module 224 to create the container, the container storage module 225 may indicate the front-end agent module 211 in the target computing node to mount the second VF device under the storage directory of the container. The second VF device may be a virtual function device that supports the virtio-blk or virtio-scsi protocol.

For a common container, the front-end agent module 211 on the target computing node may directly mount the second VF device under the storage directory of the container (the management agent module 223 may indicate the front-end agent module 211 to mount the second VF device under the storage directory of the container). For a secure container, the front-end agent module 211 on the computing node 210 may directly connect the second VF device to a secure container virtual machine, and the secure container virtual machine mounts the second VF device under the storage directory of the container.

2) Object storage resource: The object storage resource may be presented in a form of a bucket.

The object storage resource may be applied for by the storage agent module 222 in an offloading card 220 in advance. Alternatively, when determining that the container is scheduled to the target computing node, the management agent module 223 may trigger the storage agent module 222 to apply to a storage service node 400 for the block storage resource. In other words, regardless of whether the object storage resource is applied for in advance or in real time, the object storage resource is applied for by the storage agent module 222. After the object storage resource is applied for, the storage agent module 222 may mount the object storage resource to the offloading card 220, in other words, present the object storage resource to the offloading card 220 for use in a form of a device.

The container storage module 225 may create a third VF device, and associate the object storage resource with the third VF device, in other words, establish an association relationship between the object storage resource and the third VF device. In a process in which the management agent module 223 triggers a container runtime module 224 to create the container, the container storage module 225 may indicate the computing node 210 to mount the third VF device under the storage directory of the container. The third VF device may be a virtual function device that supports the virtio-fs or virtio-9p protocol.

For a common container, the agent module on the computing node 210 may directly mount the third VF device under the storage directory of the container. For a secure container, the agent module on the computing node 210 may directly connect the third VF device to a secure container virtual machine, and the secure container virtual machine mounts the third VF device under the storage directory of the container.

When needing to read data from or store data in the bucket, the container can access the bucket through a portable operating system interface (POSIX).

3) Local storage resource: The local storage resource is a storage resource on the computing node 210.

The container storage module 225 allocates the local storage resource to the container using the front-end agent module 211 in the target computing node. The local storage resource may be a subdirectory of a storage partition in the computing node 210, or may be an independent storage partition.

After the local storage resource is allocated, in a process in which the management agent module 223 triggers a container runtime module 224 to create the container, the management agent module 223 may indicate the front-end agent module 211 to mount the local storage resource under the storage directory of the container.

For a common container, the front-end agent module 211 may directly mount the local storage resource under the storage directory of the container. For a secure container, the front-end agent module 211 may share the local storage resource with a secure container virtual machine based on a file sharing protocol (for example, the virtio-9p or virtio-fs protocol). In the secure container virtual machine, the secure container virtual machine mounts the local storage resource under the storage directory of the container.

4) File storage resource

The file storage resource may be applied for by the storage agent module 222 in an offloading card 220 in advance. Alternatively, when determining that the container is scheduled to the target computing node, the management agent module 223 may trigger the storage agent module 222 to apply to a storage service node 400 for the block storage resource. In other words, regardless of whether the file storage resource is applied for in advance or in real time, the file storage resource is applied for by the storage agent module 222.

The container storage module 225 mounts, using the front-end agent module 211, the file storage resource to the target computing node or a secure container virtual machine in a form of a network file system, for use by the container.

For a common container, the front-end agent module 211 on the computing node 210 may directly mount the network file system under the storage directory of the container. For a secure container, the front-end agent module 211 on the computing node 210 may mount the network file system under the storage directory of the container in a secure container virtual machine.

After the storage resource is configured for the container, data generated during running of the container may be stored in the storage resource. For a local storage resource, the container may directly store the generated container in the local storage resource.

For a block storage resource and an object storage resource, the container may send generated data to the storage agent module 222 (for example, to a backend storage driver in the storage agent module 222) in the offloading card 220 using a VF device associated with the storage resource (for example, the second VF device or the third VF device). The storage agent module 222 sends the generated data to the storage service node 400, and the storage service node 400 stores the generated data in a storage resource allocated to the container.

For a file storage resource, a file storage service is built based on network attached storage (NAS) and is network-attached. Therefore, in a process of storing the generated data into a corresponding file storage resource, a network resource configured for the container needs to be used. The container may send the generated data to a network agent module 221 in the offloading card 220. The network agent module 221 sends the generated data to the storage node through a network resource (for example, a port) configured for the container. The storage node stores the generated data in a storage resource allocated to the container.

In this embodiment of this application, after the storage resource is configured for the container, the storage resource may be restored. A process of restoring the storage resource is opposite to a process of configuring the storage resource. The management agent module 223 may offload, using a front-end agent module in the target computing node, the VF device associated with the storage resource (for example, a block storage resource or an object storage resource). After the VF device is offloaded, the management agent module 223 may indicate the container storage module 225 to terminate an association relationship between the storage resource and the VF device, and then the container storage module 225 may indicate the storage agent module 222 to offload the storage resource from the offloading card 220.

For a file storage resource, when the storage resource is restored, the management agent module 223 may offload the file storage resource using the front-end agent module in the target computing node.

(3) Container Network Configuration

After a container is created, a network resource may be further configured for the container. Data may be exchanged between containers based on the network resource, implementing a network capability required by the container.

The network capability required by container includes a network interworking capability between containers, a service discovery capability, and a network policy control capability. The following separately describes the three aspects.

1) Network Interworking Between Containers

The network interworking capability between containers is a basic network capability required by containers. The network interworking capability between containers requires that containers can exchange data.

To enable the container to have the network interworking capability between containers, the network resource, for example, a network port, needs to be first configured for the container, such that the container can exchange data with another container via the network port.

When a management agent module 223 on a target computing node detects that a container is scheduled to the target computing node, if detecting a resource database update or receiving a container creation request, the management agent module 223 may determine, based on the updated resource database or the container creation request, a network resource to be configured for the container. The management agent module 223 may trigger a container network module 226 to prepare the network resource for the container. The container network module 226 applies to a virtual network service node 300 for the network resource using a network agent module 221, for example, applies for the network port, to obtain information such as network port information (such as a port identifier and a port quantity) and an internet protocol (IP) address.

The container network module 226 creates a fourth VF device, and establishes an association relationship between the fourth VF device and the network resource. The fourth VF device may be an abstract virtual function device based on a network adapter of an offloading card 220, or may be a virtual function device that supports the virtio-net protocol.

After the network resource is obtained, in a process in which the management agent module 223 triggers a container runtime module 224 to create the container, the container network module 226 provides the fourth VF device for the target computing node. The container network module 226 may indicate a front-end agent module 211 in the target computing node to allocate the container to the fourth VF device. Then, the front-end agent module 211 in the target computing node allocates the fourth VF device to the container based on the indication. For a common container, the front-end agent module 211 adds the fourth VF device to a namespace of the container. For a secure container, the front-end agent module 211 may directly connect the fourth VF device to the secure container, such that the container can use the fourth VF device.

2) Container Service Discovery Capability

Containers can be classified into a backend server (server) and a front-end application (application) by function. The front-end application is usually user-oriented. A user can operate the front-end application to meet a requirement, for example, click “inquire” or “run” in the front-end application. The backend server can provide computing and data for the front-end application, such that the front-end application can display a final result to the user.

Any front-end application may be connected to a plurality of different backend servers. In other words, information from one front-end application may be received by one of the plurality of different backend servers. To further control information exchange between the backend server (server) and the front-end application (application), a service discovery instance may be added. The service discovery instance may be connected to the plurality of backend servers. Alternatively, the service discovery instance may be distributedly deployed on computing nodes 210 on which the plurality of backend servers are located. Alternatively, the service discovery instance may be distributedly deployed and inserted into offloading cards 220 in the computing nodes 210 on which the plurality of backend servers are located. The offloading card 220 cooperates to perform a function of the service discovery instance. In a possible implementation, the service discovery instance distributed on each computing node 210 or offloading card 220 may also be configured on the fourth VF device associated with the network resource. In other words, a load balancing policy is configured on the fourth VF device.

The service discovery instance can receive information from the front-end application, and a destination address of the information is an address of the service discovery instance. After receiving the information, the service discovery instance transmits the information to one of the plurality of backend servers based on the load balancing policy. The load balancing policy indicates a rule of selecting one backend server from the plurality of backend servers. For example, the load balancing policy may indicate to select a backend server in an idle state or select a backend server with a strongest data processing capability. For another example, the load balancing policy may indicate a proportion of information that can be received by the plurality of backend servers.

The service discovery instance updates the destination address of the information to an address of one of the backend servers, and sends information with the updated destination address to the one of the backend servers, such that the backend server performs data processing based on the information. The service discovery instance can further feed back a processing result of the backend server to the front-end application.

It can be learned from the foregoing description that the service discovery instance is used to implement load balancing, and distribute information from the front-end application to the backend server. The load balancing policy and a correspondence between the service discovery instance and the backend server are configured by the user. For example, a management node 110 may configure a discovery service (service) under a user operation. The configuration operation performed by the management node 110 includes configuring an address of a service discovery instance supporting the discovery service, the correspondence between the service discovery instance and the backend server, and the load balancing policy. A container network module 226 in the offloading card 220 inserted into the computing node 210 may monitor the configuration operation of the management node 110, and create a service discovery instance.

A process in which the container network module 226 in the offloading card 220 creates the service discovery instance is mainly a process of configuring a service access rule. The service access rule includes the load balancing policy and a correspondence between an address of the service discovery instance and an address of the backend server. In other words, the service discovery instance includes the load balancing policy and a correspondence between a service access address and an address of a corresponding container.

When the container network module 226 determines, by interacting with the management node 110, an address of a container that is on each computing node 210 and that corresponds to the address of the service discovery instance. The address of the container may include an internet protocol (IP) address and a network port of the container, and configure the load balancing policy and the correspondence between the service access address and the address of the container.

A type and a deployment location of the service discovery instance are not limited in this embodiment of this application. For example, the service discovery instance may be centrally deployed on one computing node 210. For another example, the service discovery instance may be distributedly deployed on a plurality of computing nodes 210. The service discovery instance may be distributedly deployed in the offloading card 220 inserted into each computing node 210.

All instances that can implement load balancing are applicable to this embodiment of this application.

When the container network module 226 determines, by interacting with the management node 110, that a related container changes, the container network module 226 may further update the service discovery instance based on an address of a changed container. The container network module 226 may monitor a change in the container on the computing node 210. The change in the container includes but is not limited to new creation (a container is newly created on the computing node 210), deletion (an existing container on the computing node 210 is deleted), migration (a service of a container on the computing node 210 is migrated to another container), and the like. When determining the address of the changed container, the container network module 226 updates a correspondence between the service access address and the address of the changed container.

When the changed container is a newly created container, the container network module 226 may add a correspondence between the service access address and an address of the newly created container.

When the changed container is a deleted container, the container network module 226 may delete a correspondence between the service access address and an address of the deleted container.

When the changed container is a container after migration, the container network module 226 may update a correspondence between the service access address and an address of a container before migration to a correspondence between the service access address and an address of the container after migration.

After the service discovery instance is created or updated, when the service discovery instance receives information whose destination address is the address of the service discovery instance, the service discovery instance may change the destination address of the information based on the load balancing policy and the correspondence between the service access address and the address of the container, and forward the information to the backend server.

3) Network Policy Control Capability

The network resources provide a possibility for network interworking between containers, and the network policy control capability further restricts a manner of network interworking between containers. The network policy control capability is implemented based on a security group policy. The security group policy specifies containers that are allowed to interwork with each other and containers that are not allowed to interwork with each other. The security group policy includes an access control list (ACL). The ACL may indicate information from which container may be accepted and information from which container may be rejected.

To implement the network policy control capability, a policy control instance may be added. The policy control instance may be connected to a plurality of containers, centrally deployed on one device, and connected to a computing node on which the plurality of containers are located. Alternatively, the policy control instance may be distributedly deployed on the computing node 210 on which the plurality of containers are located. Alternatively, the policy control instance may be distributedly deployed and inserted into an offloading card in the computing nodes 210 on which the plurality of containers are located. The offloading card 220 cooperates to perform a function of the policy control instance. In a possible implementation, the policy control instance distributed on each computing node 210 or offloading card 220 may also be configured on the fourth VF device associated with the network resource. In other words, the security group policy is configured on the fourth VF device.

The policy control instance can receive information from different containers and forward the information. For example, the policy control instance receives information from a container 1. A destination address of the information is an address of a container 2. After receiving the information, the policy control instance determines, based on the security group policy, whether the information can be sent to the container 2. If determining that the information can be sent to the container 2, the policy control instance forwards the information 2 to the container 2. If determining that the information cannot be sent to the container 2, the policy control instance rejects to forward the information.

The security group policy is configured by the user. For example, the user configures, on a client, containers that are allowed to interwork with each other and containers that are not allowed to interwork with each other. After detecting the user configuration, the client may send the user configuration to the management node 110, in other words, send identifier information of the containers that are allowed to interwork with each other and identifier information of the containers that are not allowed to interwork with each other to the management node 110. After receiving the user configuration, the management node 110 may send an indication to the container network module 226 using the management agent module 223. The indication indicates the identifier information of the containers that are allowed to interwork with each other and the identifier information of the containers that are not allowed to interwork with each other. The management node 110 may configure the security group policy under a user operation. The configuration operation performed by the management node 110 includes configuring a correspondence between the containers that are allowed to interwork with each other and a correspondence between the containers that are not allowed to interwork with each other. The container network module 226 in the offloading card 220 inserted into each computing node 210 may monitor the configuration operation of the management node 110, and create the policy control instance.

A process in which the container network module 226 in the offloading card 220 creates the policy control instance is mainly configuring the security group policy. The security group policy indicates a correspondence between addresses of the containers that are allowed to interwork with each other and a correspondence between addresses of the containers that are not allowed to interwork with each other.

When the container network module 226 obtains an address of a related container by interacting with the management node 110. The address of the container may include an internet protocol (IP) address and a network port of the container. The security group policy is configured based on the configuration operation of the management node 110.

A specific type and a deployment location of the policy control instance are not limited in this embodiment of this application. For example, the policy control instance may be centrally deployed on one computing node 210. For another example, the policy control instance may be distributedly deployed on a plurality of computing nodes 210. The policy control instance may be distributedly deployed in the offloading card 220 inserted into each computing node 210. All instances that can implement load balancing are applicable to this embodiment of this application.

When the container network module 226 determines, by interacting with the management node 110, that a related container changes, the container network module 226 may further update the policy control instance based on an address of a changed container. The container network module 226 may monitor a change in the container on the computing node 210. The change in the container includes but is not limited to new creation (a container is newly created on the computing node 210), deletion (an existing container on the computing node 210 is deleted), migration (a service of a container on the computing node 210 is migrated to another container), and the like. When determining the address of the changed container, the container network module 226 updates the correspondence between the addresses of the containers that are allowed to interwork with each other and the correspondence between the addresses of the containers that are not allowed to interwork with each other.

When the changed container is a newly created container, the container network module 226 may add an address of the newly created container to the addresses of the containers that are allowed to interwork with each other, and add a correspondence between the address of the newly created container and an address of another container.

When the changed container is a deleted container, the container network module 226 may delete a correspondence between an address of the deleted container and an address of another container in the security group policy.

When the changed container is a container after migration, the container network module 226 may update a correspondence between an address of a container before migration and an address of another container to a correspondence between an address of the container after migration and the address of the another container in the security group policy.

After the policy control instance is created or updated, when the policy control instance receives information whose destination address is the address of the policy control instance, the policy control instance may determine, based on the security group policy, to forward the information. After determining that the information can be translated, the policy control instance forwards the information. Otherwise, the policy control instance rejects forwarding the information.

Figure 7:
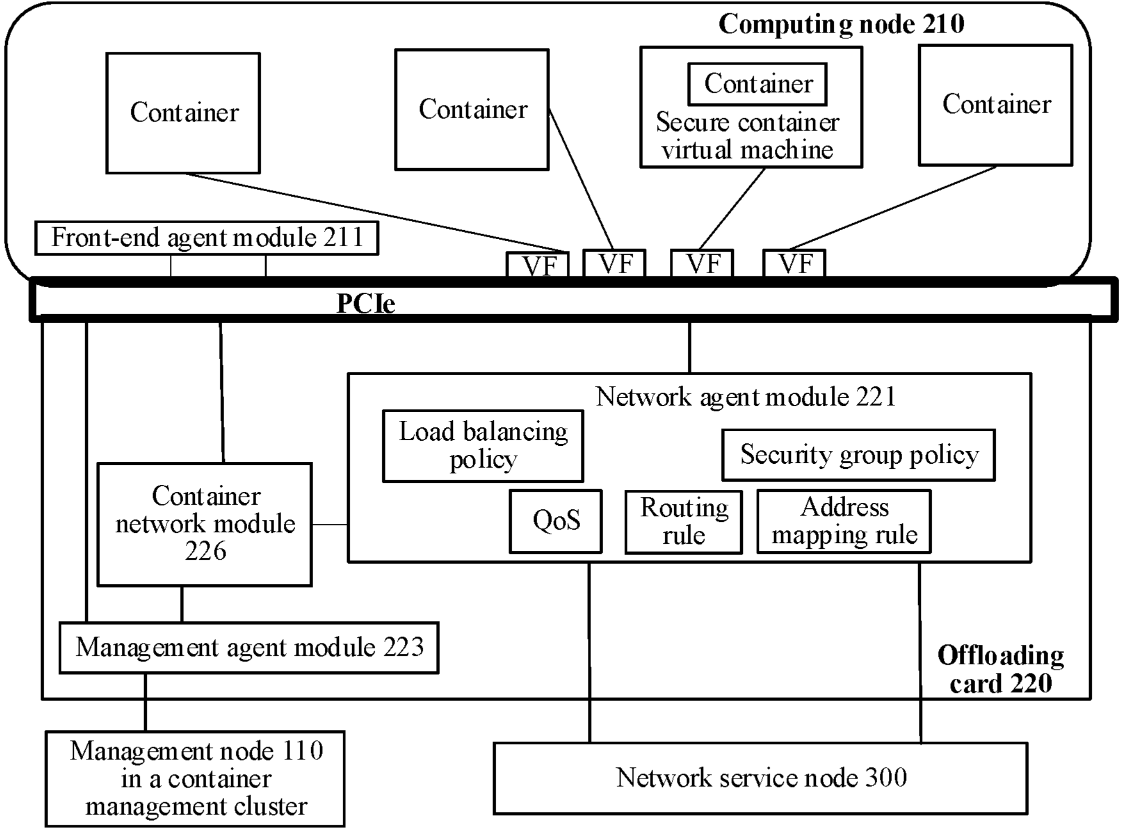
FIG. 7 is a schematic diagram of a method for configuring a network resource for a container according to this application.

FIG. 7 is a schematic flowchart of configuring a network resource for a container. In FIG. 7, a management node 110 may trigger, using a management agent module 223 in an offloading card 220, a container network module 226 to configure the network resource for the container. A container storage module 225 may apply to a network service node for the network resource through a network service agent module. Then, the container network module 226 establishes an association relationship between a virtual function device and the network resource using the network service agent module, and provides the virtual function device for a computing node 210. A front-end agent module 211 on the computing node 210 may allocate the virtual function device to the container. The management node 110 may trigger, using the management agent module 223 in the offloading card 220, the container network module 226 to configure a service access rule (for example, a load balancing policy) and a security group policy for the container.

In addition to a network interworking capability between containers, a service discovery capability, and a network policy control capability, the container may be further configured with quality of service (QoS), a routing rule, and an address mapping rule. The quality of service is used to regulate quality of service of information to be sent by the container, for example, regulate delay, blocking, monitoring, and rate limiting of the information. The routing rule is used to indicate a gateway to which the information to be sent by the container is to be sent. In other words, the information to be sent by the container can be routed to the gateway based on the routing rule. The address mapping rule is used to implement translation between a local area network address and a public network address. The address mapping rule includes NAT and full NAT. The NAT includes some or all of the following: SNAT, DNAT, and PNAT.

The quality of service, the routing rule, and the address mapping rule are configured in a similar manner in which a service discovery instance is configured. A user may configure some or all rules in the quality of service, the routing rule, and the address mapping rule through a client. After detecting the user configuration, the management node may trigger the container network module 226 to create an instance that can implement some or all of the foregoing rules (the instance may be distributedly deployed, or centrally deployed on one device. For example, the container network module 226 may configure the some or all of the foregoing rules on a fourth VF device. For details, refer to the foregoing content. Details are not described herein again.

Figure 8:
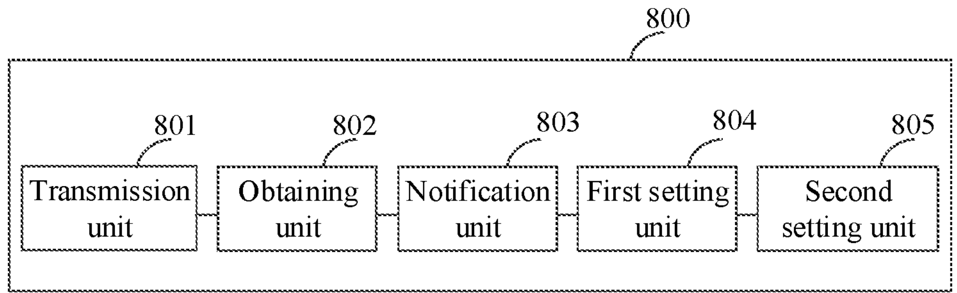
FIG. 8 is a schematic diagram of a structure of a container management apparatus according to this application.

Based on a same inventive concept as the method embodiments, an embodiment of this application further provides a container management apparatus, configured to perform the method performed by the offloading card in any one of the foregoing method embodiments. For a related feature, refer to the foregoing method embodiments. Details are not described herein again. FIG. 8 shows a container management apparatus according to an embodiment of this application. The container management apparatus 800 may be located on an offloading card. The offloading card is inserted into a computing node. A communication channel is established between the container management apparatus 800 and the computing node. The container management apparatus 800 is further connected to a container cluster management node through a network. The container management apparatus 800 is configured to manage a container on the computing node. The container management apparatus 800 includes a transmission unit 801, an obtaining unit 802, and a notification unit 803, and optionally, further includes a first setting unit 804 and a second setting unit 805.

The transmission unit 801 is configured to receive a container creation request sent by the container cluster management node. The transmission unit 801 may be configured to implement the method for receiving the container creation request by the management agent module 223 in the foregoing method embodiments.

The obtaining unit 802 is configured to obtain a container image based on the container creation request. The obtaining unit 802 may be configured to implement the method for obtaining the container image by the container runtime module 224 in the foregoing method embodiments.

The notification unit 803 is configured to indicate, through the communication channel, the computing node to create a container on the computing node based on the container image. The notification unit 803 may be configured to implement the method for indicating, by the container runtime module 224, the computing node to create the container in the foregoing method embodiments.

In a possible implementation, when indicating the computing node to create the container on the computing node based on the container image, the notification unit 803 may further create a first virtual function device, associate the container image with the first virtual function device. Then, the notification unit 803 may indicate the computing node to create a container runtime environment for the container and mount the first virtual function device under a root directory of the container.

In a possible implementation, the container management apparatus 800 is further connected to a storage service node through the network. The transmission unit 801 may apply to the storage service node for a storage resource. In other words, the transmission unit 801 performs the method performed by the storage agent module 222 in the foregoing method embodiments.

The first setting unit 804 may set a second virtual function device based on the storage resource. The first setting unit 804 may perform the method for configuring the virtual function device by the container storage module 225 in the foregoing manner embodiments.

The notification unit 803 is configured to mount the second virtual function device under a directory of the container through the communication channel. The notification unit 803 may perform the method for mounting the virtual function device by the container storage module 225 in the foregoing manner embodiments.

In a possible implementation, when setting the second virtual function device based on the storage resource, the first setting unit 804 may create the second virtual function device, and associate the storage resource with the second virtual function device.

In a possible implementation, the storage resource may be an object storage resource, or may be a block storage resource. When the storage resource is a file storage resource, the notification unit 803 may provide the file storage resource for the container on the computing node in a form of a network file system, and indicate the computing node to mount the network file system under the directory of the container.

In a possible implementation, when the notification unit 803 mounts the second virtual function device under the directory of the container through the communication channel, for a common container, the notification unit 803 may mount the second virtual function device under a storage directory of the container through the communication channel. For a secure container, the notification unit 803 may directly connect, through the communication channel, the second virtual function device to a secure container virtual machine that is used to deploy the container, and the secure container virtual machine mounts the second virtual function device under the storage directory of the container.

In a possible implementation, the container management apparatus is further connected to a network service node through the network. The transmission unit 801 may apply to the network service node for a network resource. In other words, the transmission unit 801 performs the method performed by the network agent module 221 in the foregoing method embodiments.

The second setting unit 805 may set a third virtual function device based on the network resource. The second setting unit 805 may perform the method for configuring the virtual function device by the container network module 226 in the foregoing manner embodiments.

The notification unit 803 is configured to set the third virtual function device in the container through the communication channel. The notification unit 803 may perform the method for mounting the virtual function device by the container network module 226 in the foregoing manner embodiments.

In a possible implementation, when setting the third virtual function device based on the network resource, the second setting unit 805 may create the third virtual function device, and then associate the network resource with the third virtual function device.

In a possible implementation, when setting the third virtual function device based on the network resource, the second setting unit 805 may set a network processing rule for the third virtual function device. The network processing rule includes some or all of the following: a load balancing policy, a security group policy, quality of service, a routing rule, and an address mapping rule.

In a possible implementation, when the notification unit 803 sets the third virtual function device in the container through the communication channel, for an ordinary container, the notification unit 803 adds the third virtual function device to a namespace of the container through the communication channel. For a secure container, the notification unit 803 directly connects, through the communication channel, the third virtual function device to a secure container virtual machine that is used to deploy the container.

In a possible implementation, the communication channel is a peripheral component interconnect express PCIe channel.

It should be noted that, in embodiments of this application, division into the units is an example, and is only logical function division. During actual implementation, another division manner may be used. Functional units in embodiments of this application may be integrated into one processing unit, or each of the units may exist alone physically, or two or more units may be integrated into one unit. The integrated unit may be implemented in a form of hardware, or may be implemented in a form of a software function unit.

All or some of the foregoing embodiments may be implemented by software, hardware, firmware, or any combination thereof. When software is used to implement embodiments, the foregoing embodiments may be implemented totally or partially in a form of a computer program product. The computer program product includes one or more computer instructions. When the computer program instructions are loaded or executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive (SSD).

Figure 9:
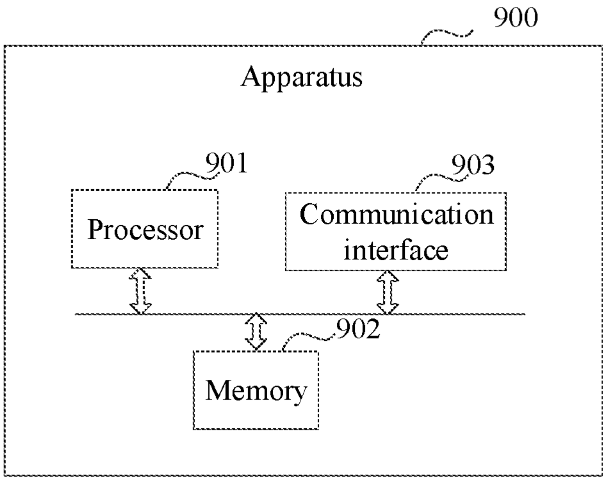
FIG. 9 is a schematic diagram of a structure of an apparatus according to this application.

In a simple embodiment, a person skilled in the art may figure out that the offloading card or container management apparatus in the foregoing embodiment may use a form shown in FIG. 9.

An apparatus 900 shown in FIG. 9 includes at least one processor 901 and a memory 902, and optionally, may further include a communication interface 903.

The memory 902 may be a volatile memory such as a random access memory. Alternatively, the memory may be a non-volatile memory such as a read-only memory, a flash memory, a hard disk drive (HDD), or a solid-state drive (SSD). Alternatively, the memory 902 is, but is not limited to, any other medium that can be used to carry or store desired program code in a form of an instruction or a data structure and that can be accessed by a computer. The memory 902 may be a combination of the memories.

A connection medium between the processor 901 and the memory 902 is not limited in this embodiment of this application.

The processor 901 may be a central processing unit (CPU). Alternatively, the processor 901 may be another general-purpose processor, a digital signal processor (DSP), an application-specific integrated circuit (ASIC), a field programmable gate array (FPGA) or another programmable logic device, a discrete gate or transistor logic device, a discrete hardware component, an artificial intelligence chip, a system on chip, or the like. The general-purpose processor may be a microprocessor or any conventional processor or the like. When communicating with another device, the processor 901 may perform data transmission through the communication interface 903, for example, receive a container creation request, apply for a storage resource, and apply for a network resource.

When the container management apparatus is in the form shown in FIG. 9, the processor 901 in FIG. 9 may invoke computer-executable instructions stored in the memory 902, such that the container management apparatus may perform the method performed by the offloading card in any one of the foregoing method embodiments.

Functions/implementation processes of the transmission unit 801, the obtaining unit 802, the notification unit 803, the first setting unit 804, and the second setting unit 805 in FIG. 8 may be implemented by the processor 901 in FIG. 9 by invoking the computer-executable instructions stored in the memory 902. Alternatively, functions/implementation processes of the obtaining unit 802, the notification unit 803, the first setting unit 804, and the second setting unit 805 in FIG. 8 may be implemented by the processor 901 in FIG. 9 by invoking the computer-executable instructions stored in the memory 902. Functions/implementation processes of the transmission unit 801 in FIG. 8 may be implemented by the communication interface 903 in FIG. 9.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, such that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a manner, such that the instructions stored in the computer-readable memory generate an artifact that includes an instruction apparatus. The instruction apparatus implements a function in one or more procedures in the flowcharts and/or in one or more blocks in the block diagrams.

The computer program instructions may alternatively be loaded onto a computer or another programmable data processing device, such that a series of operations and steps are performed on the computer or the another programmable device, such that computer-implemented processing is generated. Therefore, the instructions executed on the computer or the another programmable device provide steps for implementing a function in one or more procedures in the flowcharts and/or in one or more blocks in the block diagrams.

It is clearly that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A container management method, wherein the method comprises:

receiving, by an offloading card, a container creation request sent by a container cluster management node, wherein the container cluster management node is connected to the offloading card inserted in and communicably coupled to a computing node;

obtaining, by the offloading card, a container image based on the container creation request;

indicating, by the offloading card through a communication channel established between the offloading card and the computing node, the computing node to create a container on the computing node based on the container image;

obtaining, by the offloading card from a network service node through a network, a network resource;

setting, by the offloading card, a network processing rule for a virtual function device based on the network resource, wherein the network processing rule comprises a security group policy and an address mapping rule, wherein the security group policy comprises an access control list (ACL), wherein the address mapping rule comprises network address translation (NAT) and full NAT, and wherein the NAT comprises one or more of destination address translation (DNAT), source address translation (SNAT), or port translation (PNAT); and setting, by the offloading card based on the network processing rule, the virtual function device in the container through the communication channel for the computing node to obtain the network resource using the virtual function device.

2. The method according to claim 1, wherein the indicating the computing node to create the container on the computing node based on the container image comprises:

creating, by the offloading card, a first virtual function device; associating, by the offloading card, the container image with the first virtual function device;

indicating, by the offloading card, the computing node to create a container operating environment for the container; and mounting, by the offloading card, the first virtual function device under a root directory of the container.

3. The method according to claim 2, wherein the offloading card is further connected to a storage service node through a network, and the method further comprises:

applying, by the offloading card, to the storage service node for a storage resource;

setting, by the offloading card, a second virtual function device based on the storage resource; and mounting the second virtual function device under a directory of the container through the communication channel.

4. The method according to claim 3, wherein the setting the second virtual function device based on the storage resource comprises:

creating, by the offloading card, the second virtual function device; and associating, by the offloading card, the storage resource with the second virtual function device.

5. The method according to claim 4, wherein the mounting the second virtual function device under the directory of the container through the communication channel comprises:

connecting, by the offloading card, the second virtual function device to a secure container virtual machine for deploying the container, wherein the secure container virtual machine mounts the second virtual function device under the directory of the container in response to determining that the container is a secure container.

6. The method according to claim 1, wherein setting the network processing rule for the virtual function device based on the network resource comprises:

creating, by the offloading card, the virtual function device; and associating, by the offloading card, the network resource with the virtual function device.

7. The method according to claim 6, wherein the network processing rule further comprises one or more of a load balancing policy, a routing rule, or quality of service.

8. The method according to claim 1, wherein the setting the virtual function device in the container through the communication channel comprises:

adding, by the offloading card, the virtual function device to a namespace of the container.

9. The method according to claim 1, wherein the setting the virtual function device in the container through the communication channel comprises:

connecting, by the offloading card, the virtual function device to a secure container virtual machine for deploying the container in response to determining that the container is a secure container.

10. An offloading card, wherein the offloading card is inserted into a computing node and communicably coupled to the computing node and a container cluster management node, and the offloading card comprises at least one processor and a memory storing instructions for execution by the at least one processor to:

receive a container creation request sent by the container cluster management node;

obtain a container image based on the container creation request;

indicate, through a communication channel established between the offloading card and the computing node, the computing node to create a container on the computing node based on the container image;

obtain, from a network service node through a network, a network resource;

set a network processing rule for a virtual function device based on the network resource, wherein the network processing rule comprises a security group policy and an address mapping rule, wherein the security group policy comprises an access control list (ACL), wherein the address mapping rule comprises network address translation (NAT) and full NAT, and wherein the NAT comprises one or more of destination address translation (DNAT), source address translation (SNAT), or port translation (PNAT); and set, based on the network processing rule, the virtual function device in the container through the communication channel for the computing node to obtain the network resource using the virtual function device.

11. The offloading card according to claim 10, wherein indicate the computing node to create the container on the computing node based on the container image comprises:

creating a first virtual function device;

associating the container image with the first virtual function device;

indicating the computing node to create a container operating environment for the container; and mounting the first virtual function device under a root directory of the container.

12. The offloading card according to claim 10, wherein the offloading card is further connected to a storage service node through network, and the instructions are for execution by the at least one processor to:

apply to the storage service node for a storage resource;

set a second virtual function device based on the storage resource; and mount the second virtual function device under a directory of the container through the communication channel.

13. The offloading card according to claim 12, wherein set the second virtual function device based on the storage resource comprises:

creating the second virtual function device; and associating the storage resource with the second virtual function device.

14. The offloading card according to claim 12, wherein mount the second virtual function device under the directory of the container through the communication channel comprises:

connecting the second virtual function device to a secure container virtual machine for deploying the container, wherein the secure container virtual machine mounts the second virtual function device under the directory of the container in response to determining that the container is a secure container.

15. The offloading card according to claim 10, wherein set the network processing rule for the virtual function device based on the network resource comprises:

creating the virtual function device; and associating the network resource with the virtual function device.

16. The offloading card according to claim 10, wherein the network processing rule further comprises one or more of a load balancing policy, a routing rule, or quality of service.

17. The offloading card according to claim 10, wherein set the virtual function device in the container through the communication channel comprises:

adding the virtual function device to a namespace of the container.

18. The offloading card according to claim 10, wherein set the virtual function device in the container through the communication channel comprises:

connecting the virtual function device to a secure container virtual machine for deploying the container in response to determining that the container is a secure container.

* * * * *